United States Patent
Siniscalchi et al.

(10) Patent No.: US 12,043,924 B2
(45) Date of Patent: Jul. 23, 2024

(54) PROCESS AND PLANT FOR MAKING WADDING FLOCKS STARTING FROM A PADDED TEXTILE PRODUCT

(71) Applicant: FISI FIBRE SINTETICHE S.P.A., Oggiono (IT)

(72) Inventors: Lucio Siniscalchi, Oggiono (IT); Patrizio Siniscalchi, Oggiono (IT)

( * ) Notice: Subject to any disclaimer, the term of this patent is extended or adjusted under 35 U.S.C. 154(b) by 86 days.

(21) Appl. No.: 17/756,645

(22) PCT Filed: Nov. 2, 2021

(86) PCT No.: PCT/IB2021/060118
§ 371 (c)(1),
(2) Date: May 29, 2022

(87) PCT Pub. No.: WO2022/097016
PCT Pub. Date: May 12, 2022

(65) Prior Publication Data
US 2022/0411972 A1    Dec. 29, 2022

(30) Foreign Application Priority Data
Nov. 3, 2020    (IT) .................. 102020000026203

(51) Int. Cl.
*D01G 11/00*    (2006.01)
*D01G 25/00*    (2006.01)

(52) U.S. Cl.
CPC ............. *D01G 11/00* (2013.01); *D01G 25/00* (2013.01)

(58) Field of Classification Search
CPC . D01G 9/06; D01G 7/04; D01G 11/00; D01G 11/04; D01G 25/00; Y02W 30/66
See application file for complete search history.

(56) References Cited

U.S. PATENT DOCUMENTS

| | | | |
|---|---|---|---|
| 3,872,545 A | 3/1975 | Altosaar | |
| 4,241,474 A | 12/1980 | Doutre | |
| 4,484,377 A * | 11/1984 | Morel | D01G 11/02 241/97 |
| 4,589,166 A * | 5/1986 | Holvoet | D01G 11/00 19/145.7 |
| 5,437,080 A * | 8/1995 | Stummer | D01G 9/06 19/28 |

(Continued)

FOREIGN PATENT DOCUMENTS

| | | |
|---|---|---|
| CN | 104120510 A | 10/2014 |
| CN | 108060474 A | 5/2018 |
| CN | 109234855 A | 1/2019 |

(Continued)

OTHER PUBLICATIONS

ISR; European Patent Office; Aug. 2, 2022.

*Primary Examiner* — Aiying Zhao
(74) *Attorney, Agent, or Firm* — Patshegen IP; Moshe Pinchas

(57) ABSTRACT

A process and plant for making wadding or fiber flocks starting from a padded textile product, in which processing is carried out together and simultaneously of all the textile materials forming the same starting padded product. The process includes defibering and tearing, together and simultaneously, of fabric and wadding fibers forming the padded textile product, with formation of a single wadding layer, subsequently transformed into wadding flocks.

10 Claims, 3 Drawing Sheets

(56) References Cited

U.S. PATENT DOCUMENTS 6,435,433 B1 *   8/2002   Hesch ...................... D01B 1/26
                                                    241/188.1
2019/0100859 A1 *   4/2019   Nunn ..................... D01G 11/00

FOREIGN PATENT DOCUMENTS

| CN | 208917366 U | * | 5/2019 | ............ Y02W 30/66 |
| CN | 208917366 U |   | 5/2019 | |
| GB | 2298660 A   |   | 9/1996 | |
| WO | 2005/085124 A1 | | 9/2005 | |
| WO | 2017/155757 A2 | | 9/2017 | |

* cited by examiner

PROCESS AND PLANT FOR MAKING WADDING FLOCKS STARTING FROM A PADDED TEXTILE PRODUCT

BACKGROUND OF THE INVENTION

The present invention relates to a process and the relative plant for making wadding from recycled padded textile products.

The field of the present invention is that of the recovery of fibers coming from garments destined for disposal.

Currently this type of recovery is carried out by manually selecting the various parts that make up the garment, i.e. the internal and external fabrics, padding and other. Each single component is then cut separately into small parts, which in turn are subsequently processed with traditional Garnett machines.

The fibrous material, obtained through the described selection of the different materials that make up the garment to be recycled, is however very compact and not very bulky, therefore unsuitable for the formation of wadding that can be used as a padding material for clothes and for furniture in general.

The traditional method described above also has the drawback of requiring expensive and lengthy manual separation of the various materials to be treated and mechanical processing, which involve a considerable effort in terms of time and electricity.

CN 208 917 366 U, CN 104 120 510 A and U.S. Pat. No. 4,241,474 A describe plants for opening or defibering unpadded garments, in which only rotating cylinders are used. The plant disclosed by CN 108 060 474 A, on the other hand, performs the simple cutting of an unpadded fabric, by means of rotating blades.

SUMMARY OF THE INVENTION

The main object of the present invention is to provide a process and a plant for the recovery, in a single operation, of padded textile products that are recycled or result from surplus production, which, unlike traditional methods of the same type, allow wadding to be obtained that can be used as padding in general in the clothing and furnishing sectors.

A further object of the invention is to provide a process and a plant of the type described above with which, in simple, quick operations and without manual interventions, insulating fiber or wadding flocks can be made, starting from a padded textile product recovered or resulting from surplus production.

These and other objects are achieved with the process and plant of claims 1 and 4, respectively. Preferred embodiments will be apparent from the remaining claims.

Compared with the known embodiments of the sector, the process and plant of the invention, in an economical, rapid and entirely mechanized way, allow wadding or fiber flocks to be produced that can be used as insulating padding in the clothing and furnishing sectors.

The process and plant of the invention also have the advantage of allowing the processing of more than 200 padded garments per hour of production, with an hourly throughput of 150-200 kg/h of wadding from padded garments weighing approximately 1 kg.

This plant, which creates a sustainable circular economy, is highly compact and space-saving (about 5 m×2 m×1.5 m) but could be larger and consequently more productive.

Note that 2 kg of oil are needed to produce 1 kg of fiber; therefore, with an hourly production of 200 kg of wadding, the process and plant of the invention offer the advantage of saving about 400 kg of oil (8,000 kg of oil per day of production). In this way, a significant and substantial reduction of pollutants is obtained due to the non-use of raw material (oil) and all the consequent operations such as transport, mechanical processing of the starting textile fibers and more besides. The energy consumption required by the process and plant of the invention is in fact very low (about 10/12 kW/h); furthermore, in the complete absence of water consumption and any form of pollution, the invention can fully be placed in the context of a sustainable circular economy.

The process of the invention also allows traces of fragments of the recovered starting fabric to be left on the wadding thus made, demonstrating its origin from recovery processing of recycled materials. A certificate will be issued as a guarantee that the original material (manufactured or miscellaneous cuttings) has been cleaned and sanitized by UV radiation, with an ozone current or the like.

BRIEF DESCRIPTION OF THE DRAWINGS

These and other objects, advantages and features will be apparent from the following description of a preferred embodiment of the process and plant according to the invention illustrated by way of non-limiting example in the figures in the attached drawing sheets.

In these.

DESCRIPTION OF THE PREFERRED EMBODIMENTS

Figure 1:
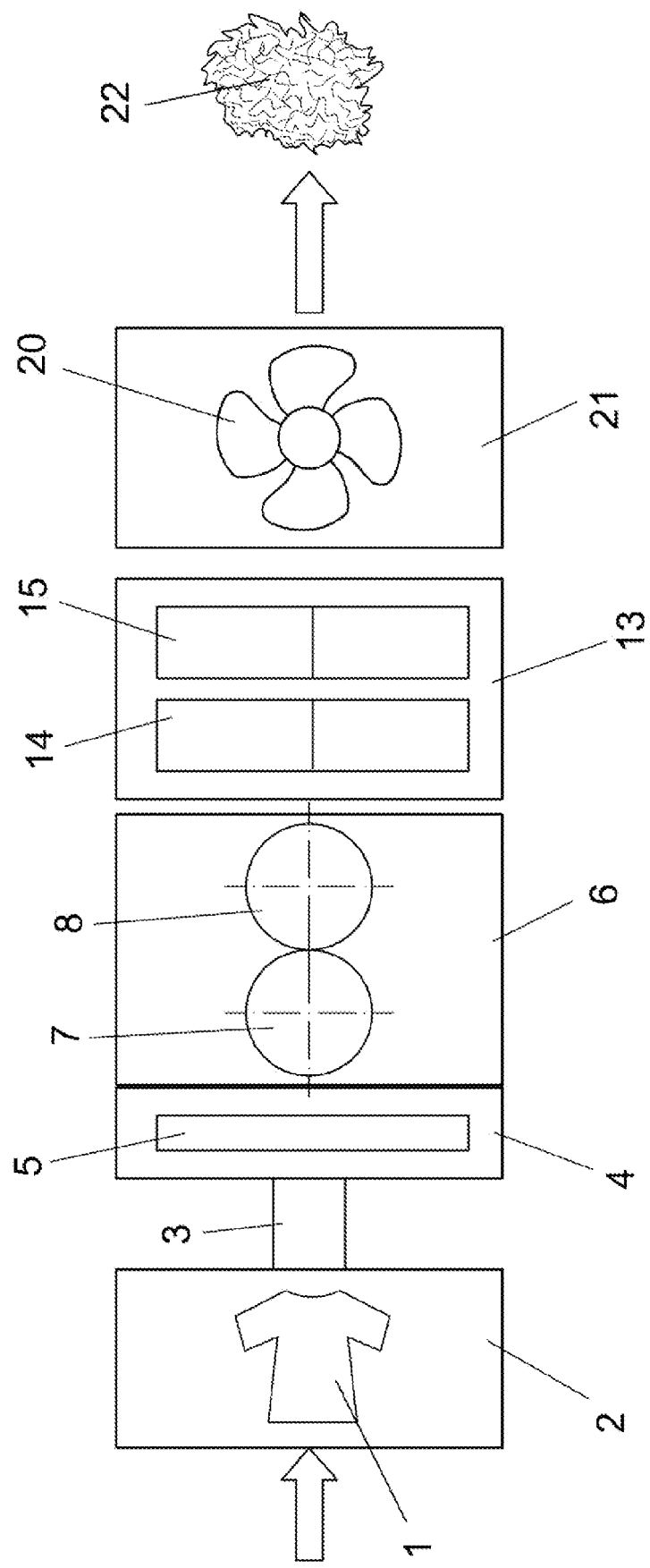
FIG. 1 is a plan view of a schematic embodiment of the plant of the invention.

In the process of the invention, the padded product 1 to be recycled, such as an insulated jacket, a sleeping bag, a bed quilt, production scraps of padded material and the like, surplus productions, padded clothing in general, preliminarily washed and with metal or plastic parts removed, is placed in a decontamination chamber 2, which allows a bactericidal action to be performed thereon, for example through contact with UV radiation, with an ozone current and the like.

The product 1 thus processed in the decontamination chamber 2 is then transferred, by means of a conveyor belt 3, to a compression station 4, equipped with a pair of rollers 5 between which the product 1 is crushed and compressed, so as to make it more workable in the subsequent stations.

Preferably, a metal detector is also provided, capable of detecting the presence of any metal parts to be eliminated.

At the exit from station 4, the crushed product 1 is then processed, in a whole comprising padding and fabrics, inside a station 6, which carries out a defibering and tearing treatment of all these materials together and simultaneously. For this purpose, in the station 6 two pairs 7 and 8 of rotating plates are provided, one of which is better illustrated in FIG. 2.

Figure 2:
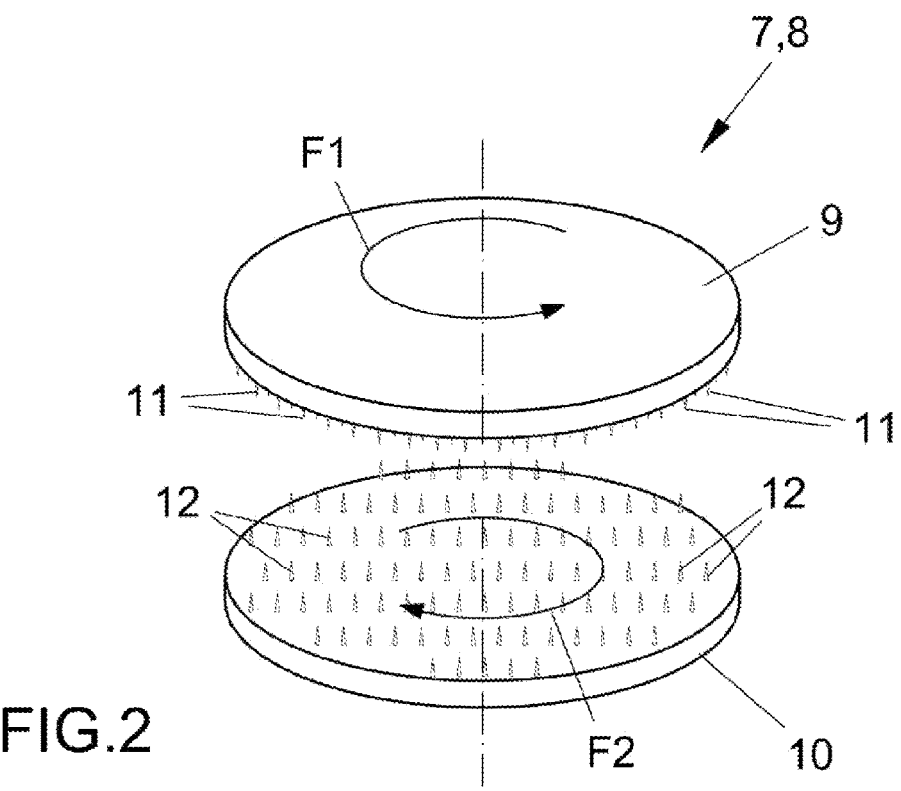
FIGS. 2 and 3 show, in side view, a pair of the rotating plates and a pair of the double cylinders, respectively, used on the plant of FIG. 1.

In particular, each of said pairs of plates is formed by an upper plate 9 and a lower plate 10 with mutually opposing rotation (arrows F1 and F2 in FIG. 2). The facing surfaces of the plates 9 and 10, between which the product 1 coming from the compression station 4 is processed, have needles 11 and 12, with different sizes and density, and in a staggered arrangement between the needles 11 of the plate 9 and the needles 12 of the plate 10.

Figure 4:
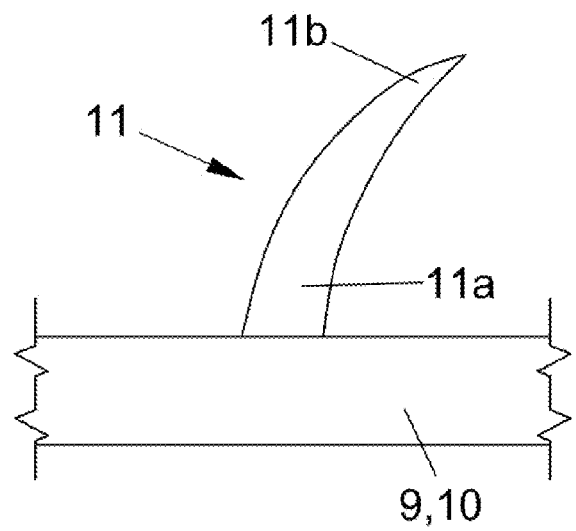
FIG. 4 is a side view of a carding willow used on the plates of FIG. 2.
Figure 5:
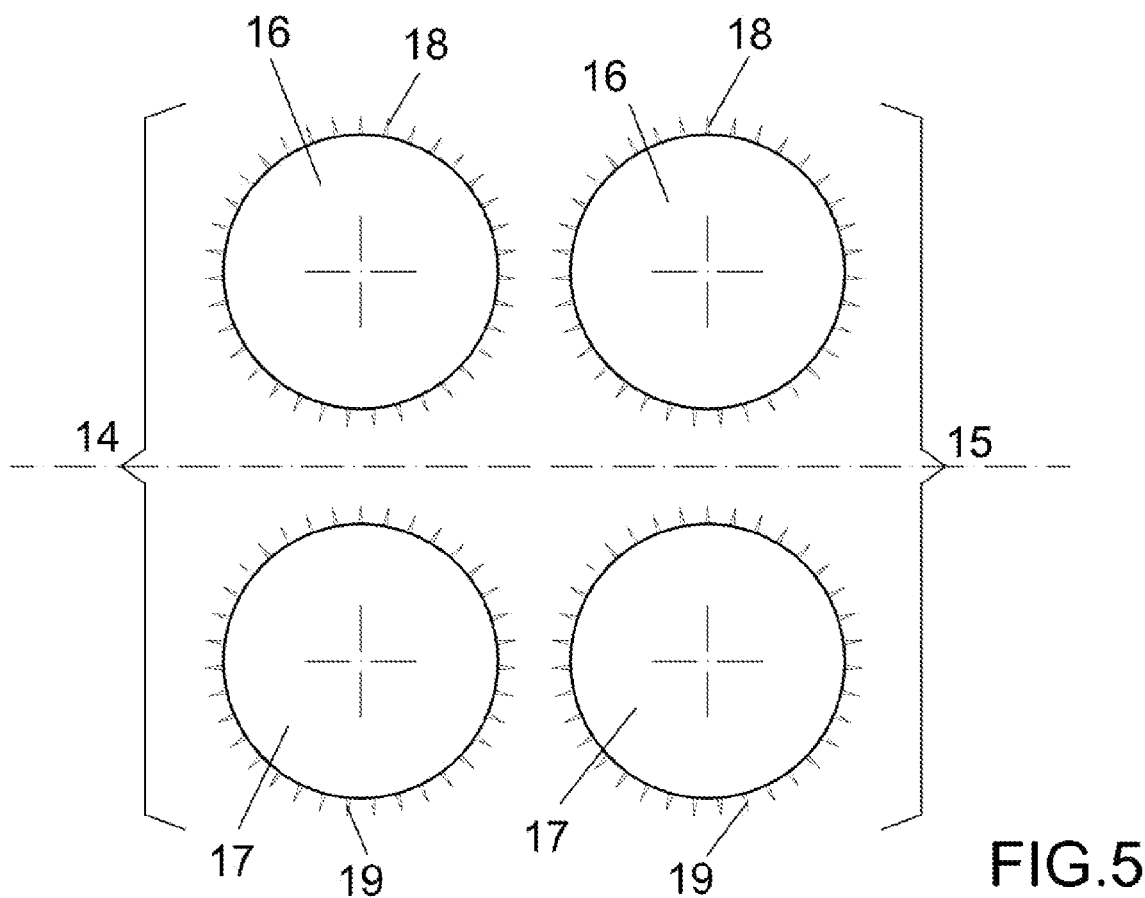
FIG. 5 shows a section of the cylinders of the station 13 of the plant of FIG. 1.

Advantageously, according to the invention, the needles 11,12 of the aforementioned pairs 7,8 of plates 9,10 are shaped like an arc or carding willow, as better illustrated in FIG. 4.

Even more advantageously, the pair 7 of plates which first receives the product 1 from the compression station 4 has large-size needles 11,12, for example with a thickness of 4 mm at the root 11$a$ and of 2 mm at the tip 11$b$, distributed with a density of, for example, 2 needles/cm$^2$. The subsequent pair 8 of plates 9,10 instead has needles 11,12 of smaller dimensions than the previous pair, for example 2 mm at the root and 1 mm at the tip, distributed with a higher density, for example 6 needles/cm$^2$. Preferably the length of the needles of said pairs of plates ranges between 2 and 3 cm.

In this way, the first pair of plates 7 performs a first coarse tearing of the padded product 1, whereas the second pair of plates 8 performs a finer and more complete tearing of the fibers of the fabric and the wadding. In this way, raw fibers of wadding and fabric come out from the first pair 7 of plates 9,10, whereas from the second pair of plates 8, thinner and shorter fibers are obtained than those coming from the previous pair of plates 9,10.

The fibrous material obtained in station 6 is then transferred, by means of suitable pneumatic conveying systems not illustrated, to the subsequent station 13 for transforming said fibrous material into a thin layer of parallelized fibers which substantially form a wadding layer.

Figure 3:
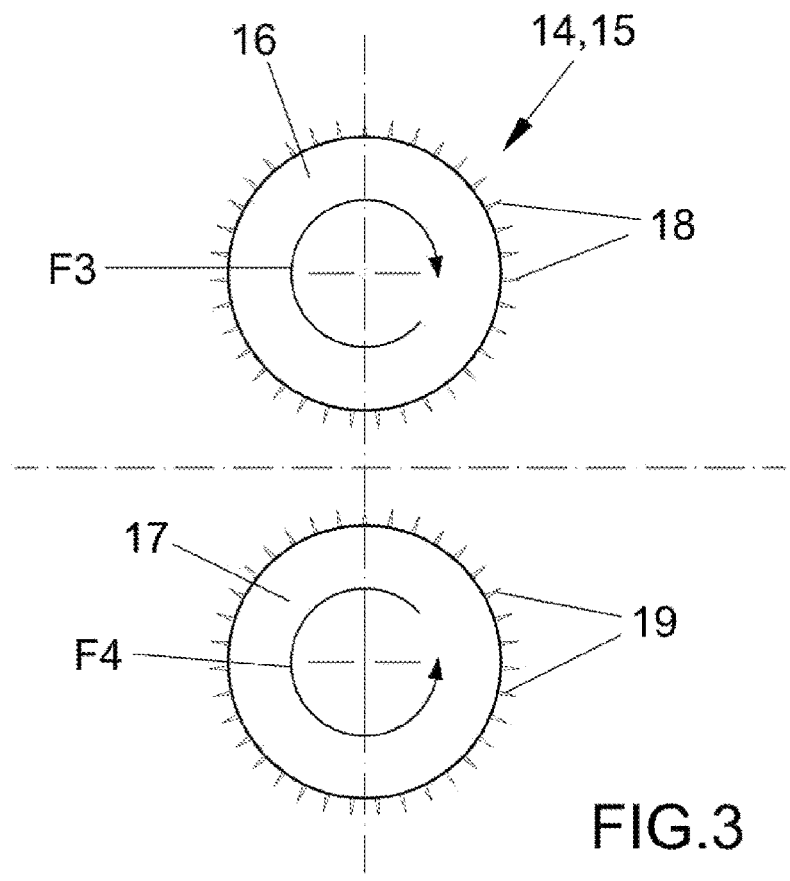

In particular, said station 13 is provided with two pairs of cylinders 14 and 15, which transform the fibrous material prepared in the previous station 6 into a layer of parallelized fibers. To this end, each pair of cylinders 14 and 15 is corns posed of an upper cylinder 16 and a lower cylinder 17, with mutually opposite directions of rotation F3 and F4 (FIG. 3). Each cylinder 16 and 17 also bears needles 18 and 19, respectively, with different length and density, fixed on suitable supports in a staggered arrangement between the needles 18 of the cylinder 16 and the needles 19 of the cylinder 17. Advantageously, the needles 18 and 19 of the first pair of cylinders 14 have larger dimensions (length and thickness) than those of the second pair 15 arranged downstream of the previous one. Preferably, the pair 14 of cylinders 16,17 which first receives the fibers from the previous station 6 has a lower density of needles 18,19 than that of the needles present on the subsequent pair 15 of cylinders.

Thanks to the aforementioned pairs of cylinders present in station 13, the fabric and wadding fibers, which come out from the previous station 6 in bulk and in a disorderly orientation, are stretched and arranged parallel to one another, so as to form a single layer of fibers, suitable for being transformed into wadding flocks in the next station.

The layer of material that comes out of station 13 is then sucked by an aspirator 20 inside a subsequent air circulation station 21, in which the textile material layer, from which the wadding flocks 22 are obtained, is torn and opened.

The process and plant described above therefore achieve the opening, together and simultaneously, of the different materials forming the product 1 to be recovered (fabrics, linings, padding of different nature, synthetic, artificial or natural, etc.), transforming them into a noble wadding fiber, usable as a padding material and for the insulation of new productions of easy-to-maintain thermal products.

The result is flocks 22 composed of a fiber which, even without having to be integrated with additional fibers with respect to those already present in the initial product 1, can have a bulkiness (or Fill Power—FP) of at least 350-400 Cuin (inches$^3$/ounce). If a higher FP is required, it is sufficient to add x percentage of fiber to the mixing chamber.

The product bulkiness, FP, significantly affects CLO values. Theoretically, we can consider that with an FP of 400 cuin of recovered material, enclosed in special fabrics, a CLO value of around 1.7-1.8 can be obtained.

Modifications may be made to the invention as above described and illustrated in the figures in order to produce variants which, nevertheless, fall within the scope of the following claims. Thus, for example, the stations 6 and 13 of the plant of the invention could also have a single pair of rotating plates and a single pair of cylinders, respectively. Furthermore, since the described defibering and tearing station 6 and the station 13 forming the wadding are essential for the invention, the decontamination chamber 2 could be omitted.

The invention claimed is:

1. A process for making a wadding starting from a padded textile product, either recycled or resulting from surplus production, comprising defibering and tearing, together and simultaneously, of fabric and wadding fibers forming said padded textile product, with formation of a single wadding layer, subsequently transformed into wadding flocks, wherein:
    a) said textile product is processed in a compression station (4), in which said textile product is crushed and compressed into a crushed and compressed product;
    b) the crushed and compressed product obtained from step a) is processed inside a defibering and tearing station (6), which carries out a defibering and tearing treatment of all materials of said crushed and compressed product together and simultaneously by means of two pairs (7,8) of rotating plates (9,10), each rotating plate of said two pairs of rotating plates being provided with needles (11,12) to obtain a fibrous material;
    c) the fibrous material obtained from said step b) is subsequently processed in a subsequent transformation station (13) for transforming said fibrous material into a thin layer of parallelized fibers which substantially form a wadding textile material layer by means of two pairs (14,15) of cylinders (16,17), each cylinder of said two pairs of cylinders being provided with needles (18,19);
    d) the wadding textile material layer obtained in step c), from which the wadding flocks are obtained, is torn and opened in a subsequent air circulation station (21).

2. A process according to claim 1, wherein said padded textile product is selected from a group consisting of an insulated jacket, a sleeping bag, a bed quilt, production scraps of padded material, surplus productions, and padded clothing.

3. A plant for making wadding starting from a padded textile product (1) comprising:
    a defibering and tearing station (6) with two pairs (7,8) of rotating plates (9,10), wherein each pair of plates of the two pairs of rotating plates is formed of an upper plate (9) and a lower plate (10) with needles (11,12) with different sizes and density and in a staggered arrangement between the needles (11) of the upper plate (9) and the needles (12) of the lower plate (10) and with mutually opposing rotation, adapted to form a fibrous material, a downstream transformation station (13) for transforming said fibrous material into a thin layer of parallelized fibers which substantially form a wadding textile material layer, wherein said transformation station (13) is provided with two pairs (14,15) of cylinders (16,17), which transform the fibrous material prepared in the defibering and tearing station (6) into a layer of parallelized fibers, wherein each pair of cylinders of the two pairs of cylinders (14,15) is composed of an upper cylinder (16) and a lower cylinder (17), with mutually opposite directions of rotation, wherein said upper cylinder and said lower cylinder bear needles (18,19) respectively, with different length and density, fixed on supports arranged in a staggered arrangement between the needles (18) of the upper cylinder (16) and the needles (19) of the lower cylinder (19), a downstream air circulation station (21), in which the wadding textile material layer, from which the wadding flocks are obtained, is torn and opened when the air circulation station is in use.

4. A plant according to claim 3, wherein a density of the needles (11,12) of a first pair of rotating plates (7) of the two pairs of rotating plates is lower than that of a second pair of plates (8) of the two pairs of rotating plates, arranged downstream of the first pair of rotating plates (7).

5. A plant according to claim 3, wherein the needles (18,19) of a first pair (14) of cylinders of the two pairs of cylinders have larger dimensions than the needles (18,19) present on a second pair (15) of cylinders of the two pairs of cylinders arranged downstream of said first pair (14) of cylinders.

6. A plant according to claim 3, wherein said air circulation station (21) is arranged downstream of said transformation station (13) and said air circulation station (21) is provided with an aspirator (20) for transformation of said wadding textile material layer obtained in said transformation station (13) into wadding flocks.

7. A plant according to claim 3, further comprising a chamber (2) with UV rays or ozone current for decontamination of said padded textile product (1).

8. A plant according to claim 3, further comprising a compression station (4) provided with rollers (5) for compressing and crushing said padded textile product (1) upstream of said defibering and tearing station (6) with rotating plates.

9. A plant according to claim 3, further comprising a metal detector for detecting a presence of metal parts to be eliminated.

10. A process according to claim 1, comprising forming said wadding flocks having a bulkiness of at least 350-400 Cuin.

* * * * *